(12) United States Patent
Spalink et al.

(10) Patent No.: US 7,454,713 B2
(45) Date of Patent: Nov. 18, 2008

(54) APPARATUS, METHODS AND COMPUTER PROGRAM PRODUCTS PROVIDING MENU EXPANSION AND ORGANIZATION FUNCTIONS

(75) Inventors: Karin Spalink, Durham, NC (US); James B Cunningham, Raleigh, NC (US)

(73) Assignee: Sony Ericsson Mobile Communications AB (SE)

( * ) Notice: Subject to any disclaimer, the term of this patent is extended or adjusted under 35 U.S.C. 154(b) by 855 days.

(21) Appl. No.: 10/724,941

(22) Filed: Dec. 1, 2003

(65) Prior Publication Data

US 2005/0119031 A1    Jun. 2, 2005

(51) Int. Cl.
*G06F 3/048* (2006.01)
(52) U.S. Cl. .................. 715/828; 715/811
(58) Field of Classification Search ........ 715/811, 715/825, 828, 829, 841, 810
See application file for complete search history.

(56) References Cited

U.S. PATENT DOCUMENTS

| | | | | |
|---|---|---|---|---|
| 5,757,371 | A * | 5/1998 | Oran et al. | 715/779 |
| 6,047,197 | A | 4/2000 | Jarrad | |
| 6,121,968 | A * | 9/2000 | Arcuri et al. | 715/825 |
| 6,232,972 | B1 * | 5/2001 | Arcuri et al. | 715/815 |
| 6,278,450 | B1 * | 8/2001 | Arcuri et al. | 715/763 |
| 6,580,442 | B1 * | 6/2003 | Singh et al. | 715/840 |
| 2003/0064757 | A1 | 4/2003 | Yamadera et al. | |

FOREIGN PATENT DOCUMENTS

WO    WO 01/61444 A2    8/2001

OTHER PUBLICATIONS

Microsoft: "Windows 2000" Operating System, 2000 XP002422956 screen shot [retrieved on Mar. 1, 2001], Figures 1-4.
European Search Report, European Application No. 06026671.5-2414, Mar. 23, 2007.
International Search Report and The Written Opinion of the International Searching Authority for International Application No. PCT/US2004/041172 mailed on Aug. 24, 2005.
Invitation to Pay Additional Fees, PCT/US2004/041172; Apr. 22, 2005.
Sony Ericsson GSM 900/1800/1900 Manual, May 2003, 93 pages.
Sony Ericsson P800 User's Guide, Nov. 2002, 197 pages.
Motorola C330 Series Phone Manual, 2002, 162 pages.
Motorola C331 Series Phone Manual, 2002, 182 pages.
Sprint Online User's Guide, PCS Phone Handspring® Treo™ 300 User Guide, 2002, 276 pages.

* cited by examiner

*Primary Examiner*—Thanh T Vu
(74) *Attorney, Agent, or Firm*—Myers Bigel Sibley & Sajovec, PA

(57) ABSTRACT

Display of menu items on a display of an electronic device, such as a cellphone or other portable device, is managed by defining first and second menus including respective first and second groups of menu items (e.g., graphic icons and/or text), wherein the first group of menu items is a subset of the second group of menu items. The device transitions from display of the first menu to display of the second menu responsive to user activation of a menu expansion function. Menu items may be organized responsive to user input.

27 Claims, 6 Drawing Sheets

APPARATUS, METHODS AND COMPUTER PROGRAM PRODUCTS PROVIDING MENU EXPANSION AND ORGANIZATION FUNCTIONS

BACKGROUND OF THE INVENTION

The present invention relates to displays for portable electronic devices, and more particularly, to management of menu items on a display screen of a portable electronic device.

Portable electronic devices, such as cellphones, that have relatively small displays typically use a concept-based menu structure. A typical menu structure includes a top-level (or "main") menu, which provides a list of menu items that categorizes features of the cellphone. Lower level menus that provide functions falling within a category corresponding to a main menu item are typically accessed by selecting that main menu item. Commonly, menu items are provided in a scrollable list format, and labeling typically follows a predetermined sorting order, such as alphabetical order or date of creation.

Several conventional devices provide for limited "personalization" of menus. For example, some cellphones provide the user with the capability to change the order in which lists of menu items are displayed. Such a feature may be used, for example, to place more frequently used items at the top of a list to reduce the amount of user scrolling. Electronic devices with more sophisticated graphics capabilities, such as personal digital assistants (PDAs) (which may or may not have wireless communications capability), may provide a user with a capability to move menu items on a metaphorical desktop and/or among user-selectable (e.g., tabbed) menus. In this manner, menu items could for example, be placed on a particular menu tab that is tailored to a specific environment, e.g., a business or personal use environment.

SUMMARY OF THE INVENTION

According to some embodiments of the present invention, display of menu items on a display of an electronic device, such as a cellphone or other portable device, is managed by defining first and second menus including respective first and second groups of menu items (e.g., graphic icons and/or text), wherein the first group of menu items is a subset of the second group of menu items. The device transitions from display of the first menu to display of the second menu responsive to user activation of a menu expansion function. For example, the first menu may include a menu expansion function menu item, and transitioning from display of the first menu to display of the second menu may occur responsive to user selection of the menu expansion function menu item. In some embodiments, the first menu includes a first array of icons having a first number of rows and a first number of columns, and the second menu includes a second array of icons having a second number of rows and a second number of columns, wherein the second number of rows is greater than the first number of rows and/or the second number of columns is greater than the first number of columns.

According to further embodiments, the electronic device transitions from display of the second menu to display of the first menu responsive to user activation of a menu reduction function. For example, the second menu may include a menu reduction function menu item, and transitioning from display of the second menu to display of the first menu may occur responsive to user selection of the menu reduction function menu item.

In further embodiments of the present invention, defining first and second menus includes assigning a menu item to the first menu or the second menu responsive to a user input. For example, a menu item may be assigned to the first menu or the second menu responsive to frequency of usage of a function corresponding to the menu item.

According to further aspects of the present invention, display of menu items on a display of an electronic device is managed by displaying a first two-dimensional array of menu items on the display, identifying one of the menu items responsive to a user input, accepting user activation of a menu rearrangement function, providing a user interface for identification of a new array location for the identified menu item responsive to user activation of the menu rearrangement function, identifying a new array location for the identified menu items responsive to a user input, and displaying a second two-dimensional array of the menu items with the identified menu item in the new array location. Accepting user activation of a menu rearrangement function may include displaying an options menu including a menu rearrangement menu item responsive to a user input and accepting user selection of the menu rearrangement menu item. Providing a user interface for identification of a new array location may include displaying the first two-dimensional array and moving a graphic indicator to the new array location responsive to a user command. Identifying a new array location may include accepting user selection of the new array location.

According to further embodiments, the first menu item is displayed at a first array location and a second menu item is displayed at a second array location. The first menu item is identified for movement to the second array location. The first menu item replaces the second menu item at the second array location and the second menu item replaces the first menu item at the first array location.

In further embodiments of the present invention, an electronic device includes a display and a user input device. The device further includes a processor operatively associated with the user input device and the display. The processor is configured to define first and second menus including respective first and second groups of menu items, the first group of menu items a subset of the second group of menu items. The processor is operative to transition from display of the first menu to display of the second menu responsive to user activation of a menu expansion function via the user input device.

In additional embodiments of the present invention, an electronic device includes a display and a user input device. A processor is operatively associated with the user input device and the display. The processor is configured to display a first two-dimensional array of menu items on the display, to identify one of the menu items responsive to a user input, to accept user activation of a menu rearrangement function via the user input device, to provide a user interface for identification of a new array location for the identified menu item responsive to user activation of the menu rearrangement function, to identify a new array location for the identified menu items responsive to a user input and to display a second two-dimensional array of the menu items with the identified menu item in the new array location.

In still further embodiments of the present invention, a program product for managing display of menu items on a display of an electronic device is provided. The program product includes code embodied in a processor-accessible medium. The code includes code configured to define first and second menus including respective first and second groups of menu items, wherein the first group of menu items is a subset of the second group of menu items. The program product further includes code configured to transition from display of the first menu to display of the second menu responsive to user activation of a menu expansion function.

In other embodiments of the present invention, a program product for managing display of menu items on a display of an electronic device includes code configured to display a first two-dimensional array of menu items on the display, code configured to identify one of the menu items responsive to a user input, code configured to accept user activation of a menu rearrangement function, code configured to provide a user interface for identification of a new array location for the identified menu item responsive to user activation of the menu rearrangement function, code configured to identify a new array location for the identified menu items responsive to a user input, and code configured to display a second two-dimensional array of the menu items with the identified menu item in the new array location.

DETAILED DESCRIPTION OF EXEMPLARY EMBODIMENTS

Figure 1:
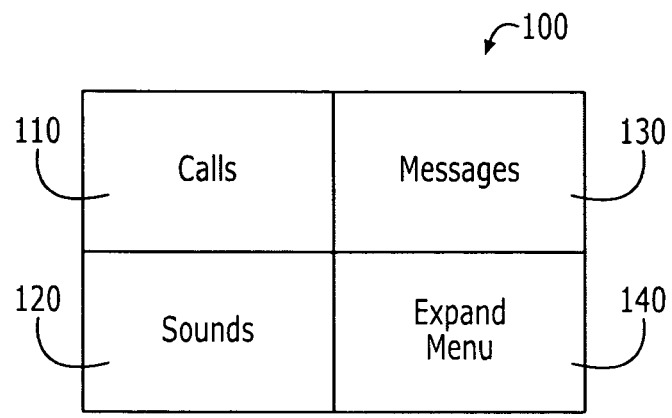
FIGS. 1-3 illustrate exemplary menus and menu expansion operations according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present.

The present invention is described below with reference to block diagrams and display illustrations that illustrate methods, apparatus and computer program products according to some embodiments of the invention. It will be understood that block diagrams and screen displays can be implemented in code that may be provided, for example, to a processor of a portable electronic device, such as a cellphone, personal digital assistant (PDA), pager, e-book reader, or the like, to produce a machine, such that the code, when processed by the processor, embodies data structures and/or means for implementing acts specified in the figures. Such code may also be embodied in a storage medium, such as a random access memory (RAM), a programmable read-only memory (PROM), memory stick, SIM card, web server or the like, that can direct a processor to operate in a particular manner, such that the instructions embodied in the storage medium produce an article of manufacture including code configured to implement the data structures and or acts specified in the figures. The code may also be loaded onto a processor to cause a series of operational steps to be performed on the processor to produce a process such that the code executed on the processor implements the acts specified in the figures.

Figure 2:
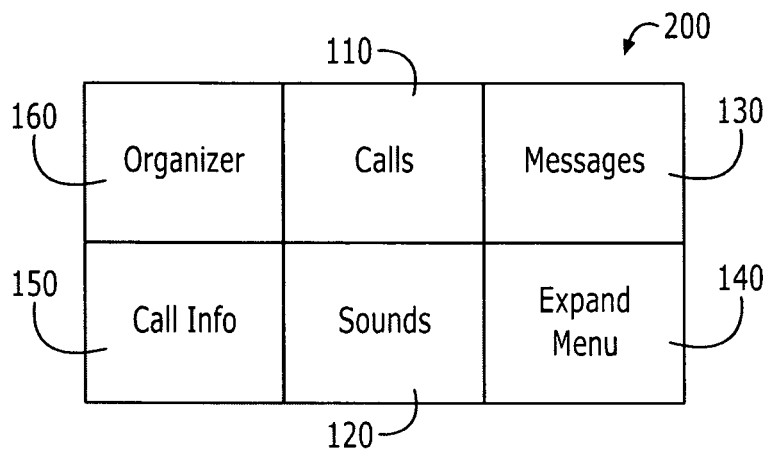
Figure 3:
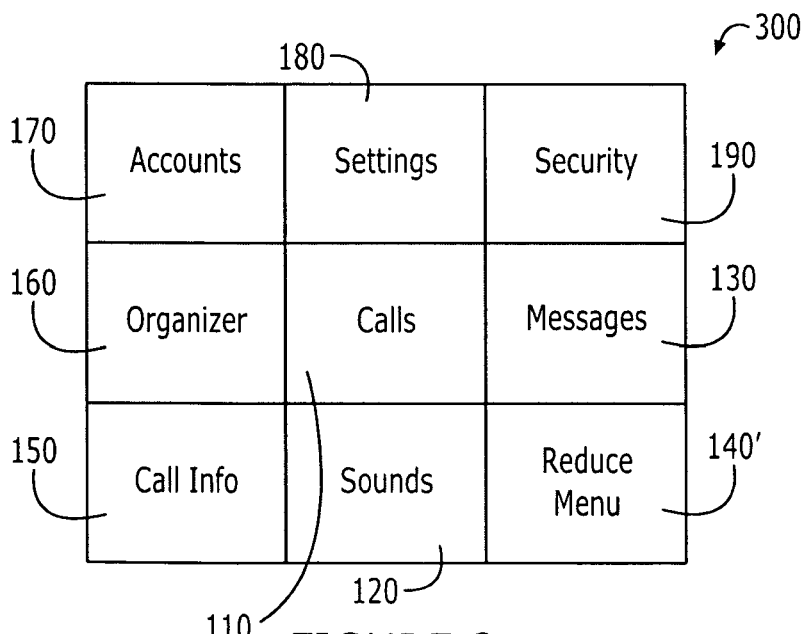

FIGS. 1-3 illustrates a series of exemplary menus 100, 200, 300 that may be provided on a display of an electronic device, for example, a portable electronic device, such as a cellphone or PDA, according to some embodiments of the present invention. In the first display 100, a first menu including a group of menu items 110, 120 and 130 are displayed concurrent with a menu expansion function menu item 140. As shown, the menu items of the group of menu items 1110, 120, 130 correspond to respective call record, text message and sound setting functions. In the illustrated embodiments of FIG. 2, the menu items 110, 120, 130, 140 are displayed as a 2×2 array.

User selection of the menu expansion function menu item 140 causes a transition to display of the menu 200 of FIG. 2, which includes the original group of menu items 110, 120, 130, along with an additional column of menu items 150, 160 corresponding to respective organizer and call information functions. As shown, the original group of menu items 110, 120, 130 retain their original mutual relationships, which can ease user interaction with the new menu. A menu expansion function menu item 140 is also displayed, indicating that at least one more level of menu expansion is available.

User selection of the menu expansion function menu item 140 leads to display of the menu 300 of FIG. 3. The menu 300 includes the menu items 110, 120, 130, 150, 160 of FIG. 2, which retain their mutual relationships. The expanded menu 300 further includes an additional row of menu items 170, 180, 190, which correspond to respective account information, phone settings, and security functions of the device. In the illustrated embodiments of FIGS. 1-3, the menu 300 represents the maximum menu expansion. The menu 300 includes a menu reduction function menu item 140' that leads back to the reduced-order menu 100 of FIG. 1, i.e., such that the menus 100, 200, 300 can be traversed in a cyclical fashion. It will be appreciated, however, that other traversals may be provided within the scope of the present invention. For example, instead of offering only a menu expansion function in the intermediary menu 200, the menu 200 could include both expansion and reduction function menu items, which could be used to traverse to the menu 300 of FIG. 3 and the menu 100 of FIG. 1, respectively. In such a configuration, the menu reduction function menu item 140' of FIG. 3 might be used to traverse directly to the intermediary menu 200. It will be further appreciated that a wide variety of traversal techniques may be used with the present invention, and that more than 3 orders of menus may be provided.

Figure 4:
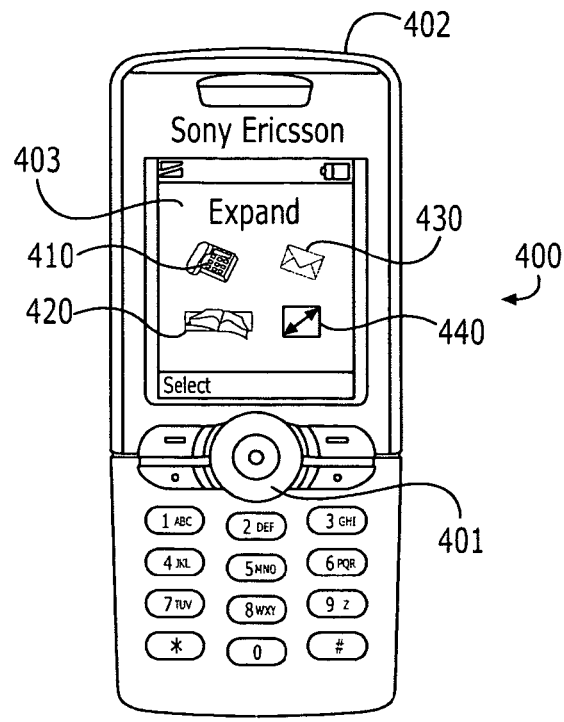
FIGS. 4-6 illustrate exemplary menus and menu expansion operations for a cellphone according to further embodiments of the present invention.
Figure 5:
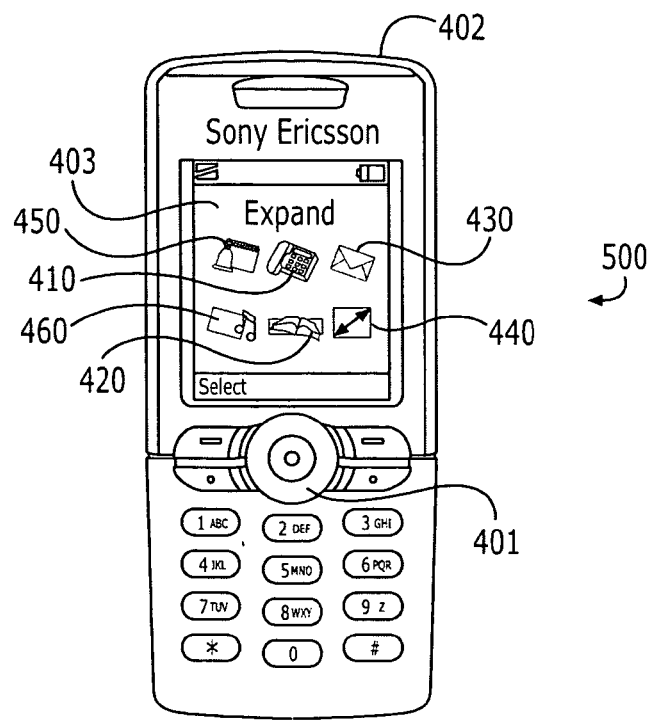
Figure 6:
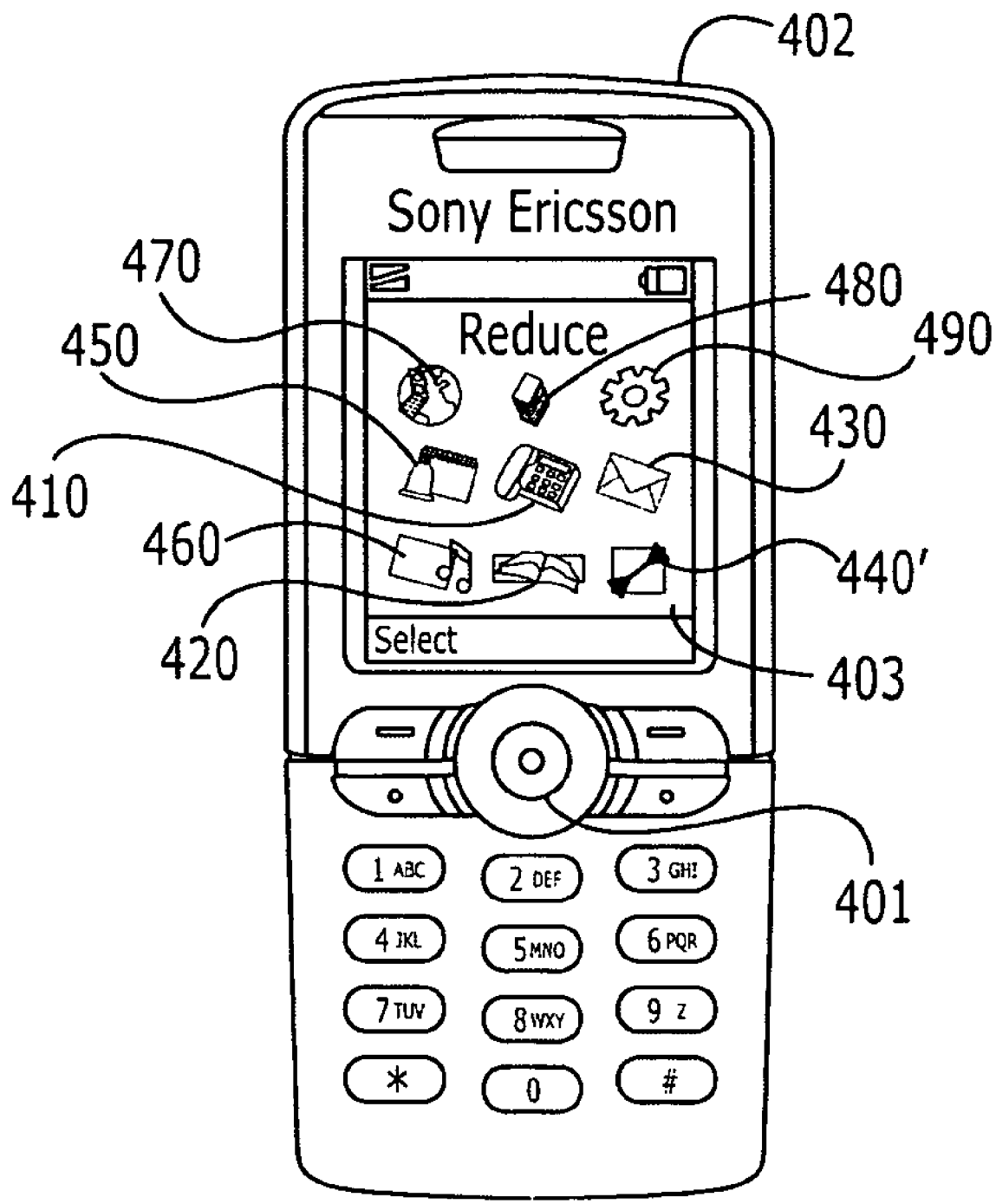

FIGS. 4-6 illustrates exemplary menu management in a cellphone 402 according to further embodiments of the present invention. The cellphone 402 includes a display 403 and a user input device in the form of a joystick 401. In FIG. 4, a first menu of functional icons including a call list function icon 410, a phonebook function icon 420, a text message function icon 430, and a menu expansion function icon 440 are provided. Referring to FIG. 2, selection of the menu expansion function icon 440 (e.g., using the joystick 401) causes transition to display of a second menu of function icons including the original icons 410, 420, 430, and an addition column of icons including an organizer function icon 450 and a sounds function icon 460. Re-selection of the menu expansion function icon 440 leads to the display of a further expanded menu of FIG. 6, which includes the icons 410, 420, 430, 450, 460, and an additional row of icons including an internet function icon 470, a games function icon 480 and a settings function icon 490. In this last menu, the menu expansion function icon 440 is replaced with a menu reduction function icon 440', which may be used in a manner similar to that described above with reference to FIGS. 1-3.

It will be appreciated that the apparatus and operations illustrated in FIGS. 4-6 are provided for exemplary purposes, and that many variations of the illustrated apparatus and operations fall within the scope of the present invention. For example, although embodiments of invention implemented in small-screen applications, such as in a cellphone, PDA or similar portable device, may be particularly advantageous, it will be appreciated that the present invention is also applicable to other applications, such as in desktop, notebook and laptop computers (e.g., in web portals and portlets), personal digital assistants (PDAs), in pagers, in e-book devices, and in electronic messaging devices (e.g., BlackBerry®). It will also be appreciated that the present invention is generally applicable to the management of menus including textual items, iconic items, and combinations thereof. It will be further understood that arrangement of the various menu items shown in the menus of FIGS. 4-6 may occur responsive to user input (e.g., as described below with reference to FIGS. 7-11) and/or may be automatically performed by the portable electronic device responsive to, for example, a determination of the relative frequencies at which the respective functions associated with the function icons are invoked by a user. In this manner, the placement of icons in the menus can be tailored to the needs of the user, e.g., by placing more frequently used menu items at locations that provide display of these icons when the menu order is reduced.

Figure 7:
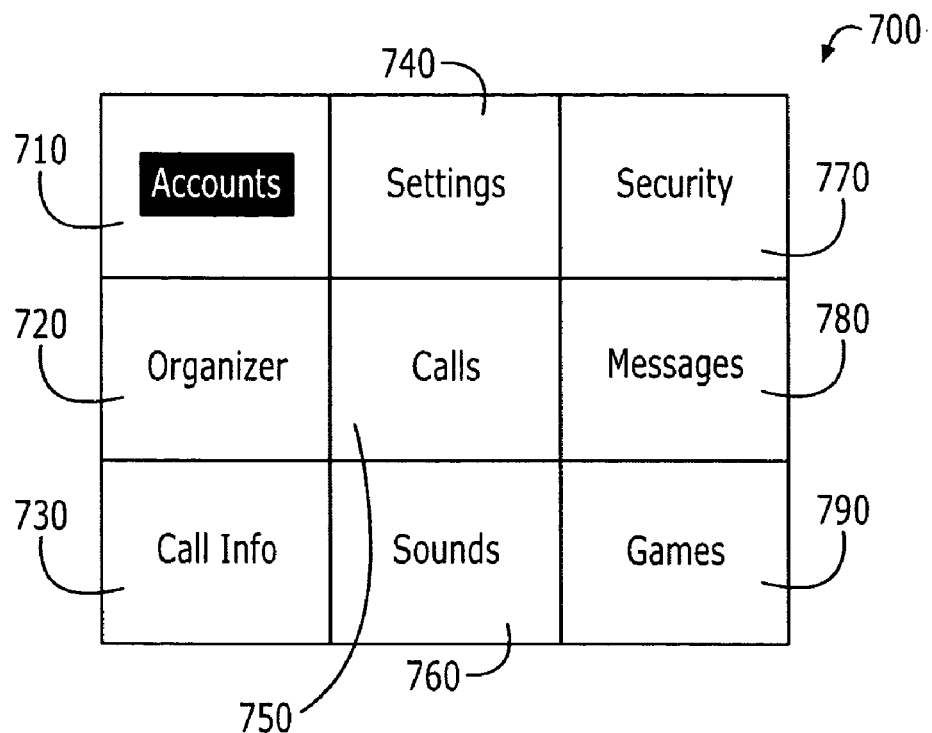
FIGS. 7-10 illustrate exemplary menus and menu organization operations according to further embodiments of the present invention.
Figure 8:
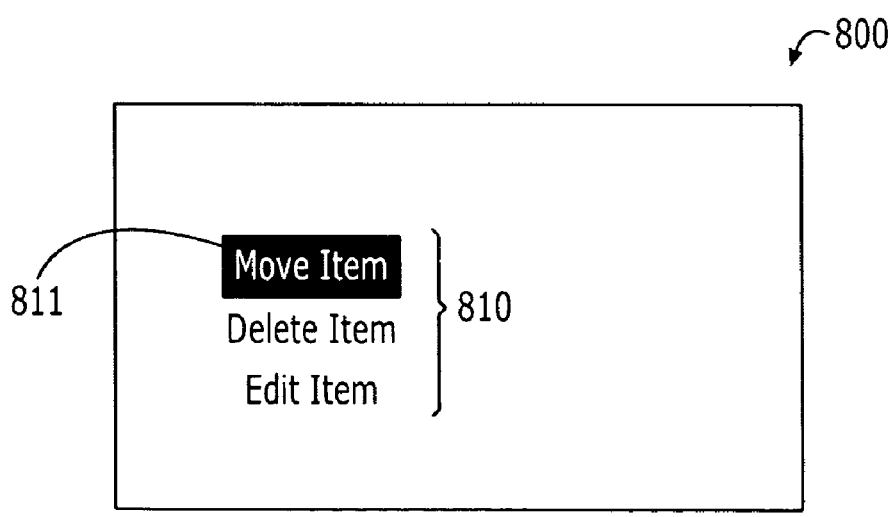
Figure 9:
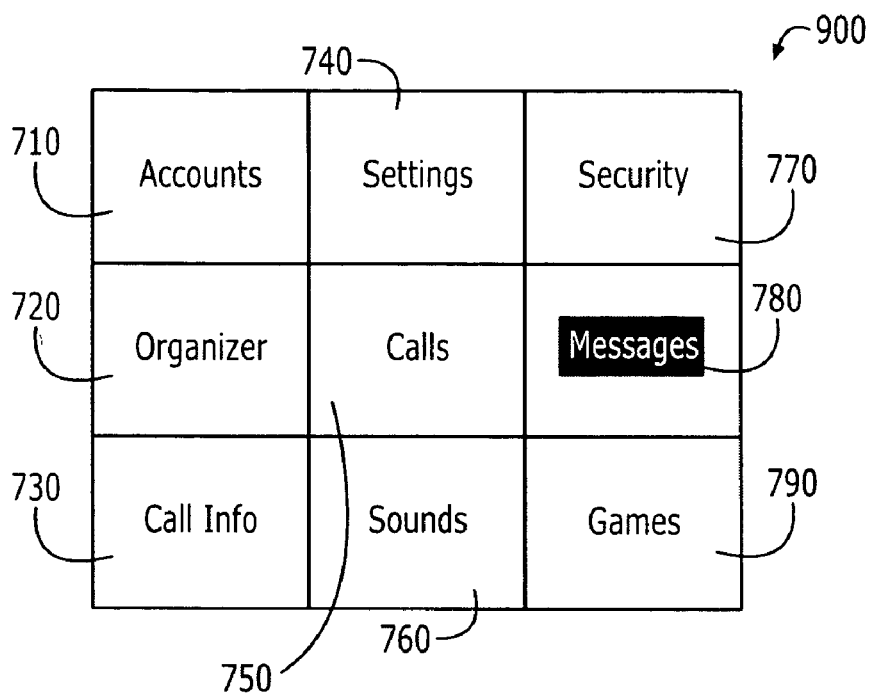
Figure 10:
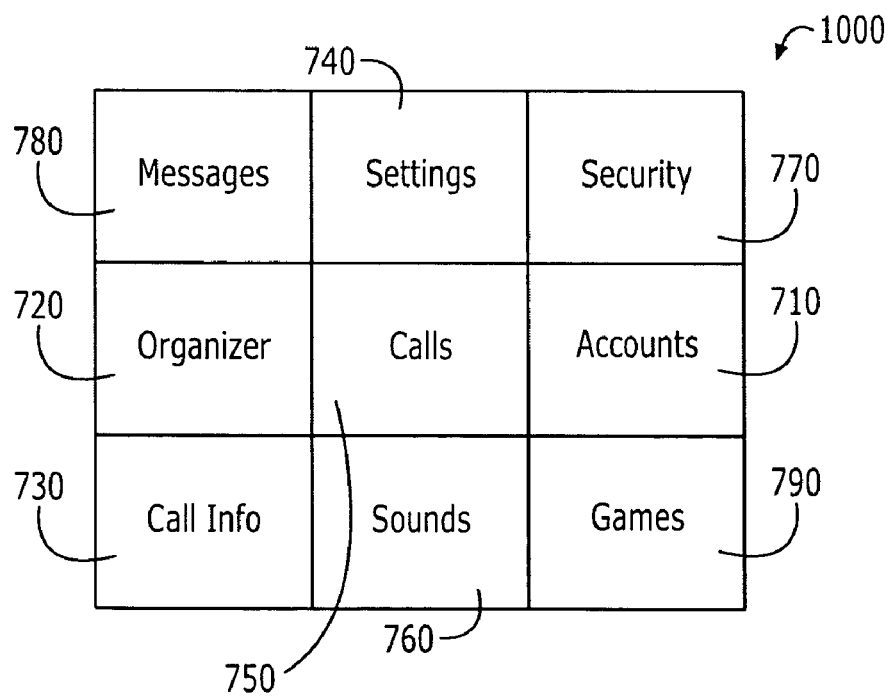

FIGS. 7-10 show a series of menus 700, 800, 900, 1000 that illustrate exemplary menu organization operations according to further aspects of the present invention. Referring to FIG. 7, the menu 700 includes an array of menu items including an accounts function menu item 710, an organizer function menu item 720, a call information function menu item 730, a settings function menu item 740, a call record menu item 750, a sounds function menu item 760, a security function menu item 770, a messages function menu item 780 and a games function menu item 790. As indicated by the highlighting in FIG. 7, a user may identify (e.g., using a joy stick, trackpointer, keypad, or other user input device) one of the menu items 710, 720, 730, 740, 750, 760, 770, 780, 790 for rearrangement. Responsive to selection of the identified menu item (e.g., by pressing an "options" key), an options menu 800 as illustrated in FIG. 8 may be displayed. As shown, the user may then identify and select a "Move Item" function, resulting in redisplay of the menu array of FIG. 7 in a menu 900. The user may move a graphic indicator (as shown, a highlight box) to a desired new array location in the menu 900. Upon identification of the desired new array location (e.g., via an appropriate input to a joystick or keypad), the rearranged menu 1000 of FIG. 10 is displayed, with the selected menu item 710 moved to the array location formally occupied by the menu item 780, and the menu item 780 moved to the array location previously occupied by the menu item 710. Optionally, the device may additionally prompt the user for a confirmation of the new menu arrangement.

It will be appreciated that the menu management operations of FIGS. 7-10 are provided for exemplary purposes, and that variations of these menus and operations fall within the scope of the present invention. It will be appreciated, for example, that menu management operations as described above may be used with textual items, iconic items, and combinations thereof. It will be further appreciated that the invention is not limited to the cellphone-type applications illustrated, and that the menu organization operations described herein are equally applicable to other environments, such as in computers, pagers and PDAs. It will also be understood that the invention is not limited to rectilinear arrays of menu items, and is equally applicable to other menu item arrangements.

It will also be understood that, according to further embodiments of the present invention, the menu expansion/reduction operations described above with reference to FIGS. 1-6 may be combined with the menu organization operations described with reference to FIGS. 7-10. For example, menu organization operations along the lines described with reference to FIGS. 7-10 may be used to arrange menu items in a menu such as the fully expanded menus illustrated in FIGS. 3 and 6. In this manner, a user may, for example, tailor which menu items would appear in the subarrays shown in the reduced-order menus displayed in FIGS. 1, 2, 4 and 5. For example, a user may arrange menu items such that more frequently used items, such as the items displayed in FIGS. 1 and 4, appear in reduced order menus, while less frequently used items are arranged such that they only appear when the menus are expanded. It will be appreciated that such arrangement may occur responsive to user input, for example, as described with reference to FIGS. 7-10, or may be automatically performed by the electronic device responsive to, for example, a determination of the frequency with which a user invokes particular functions of the device.

Figure 11:
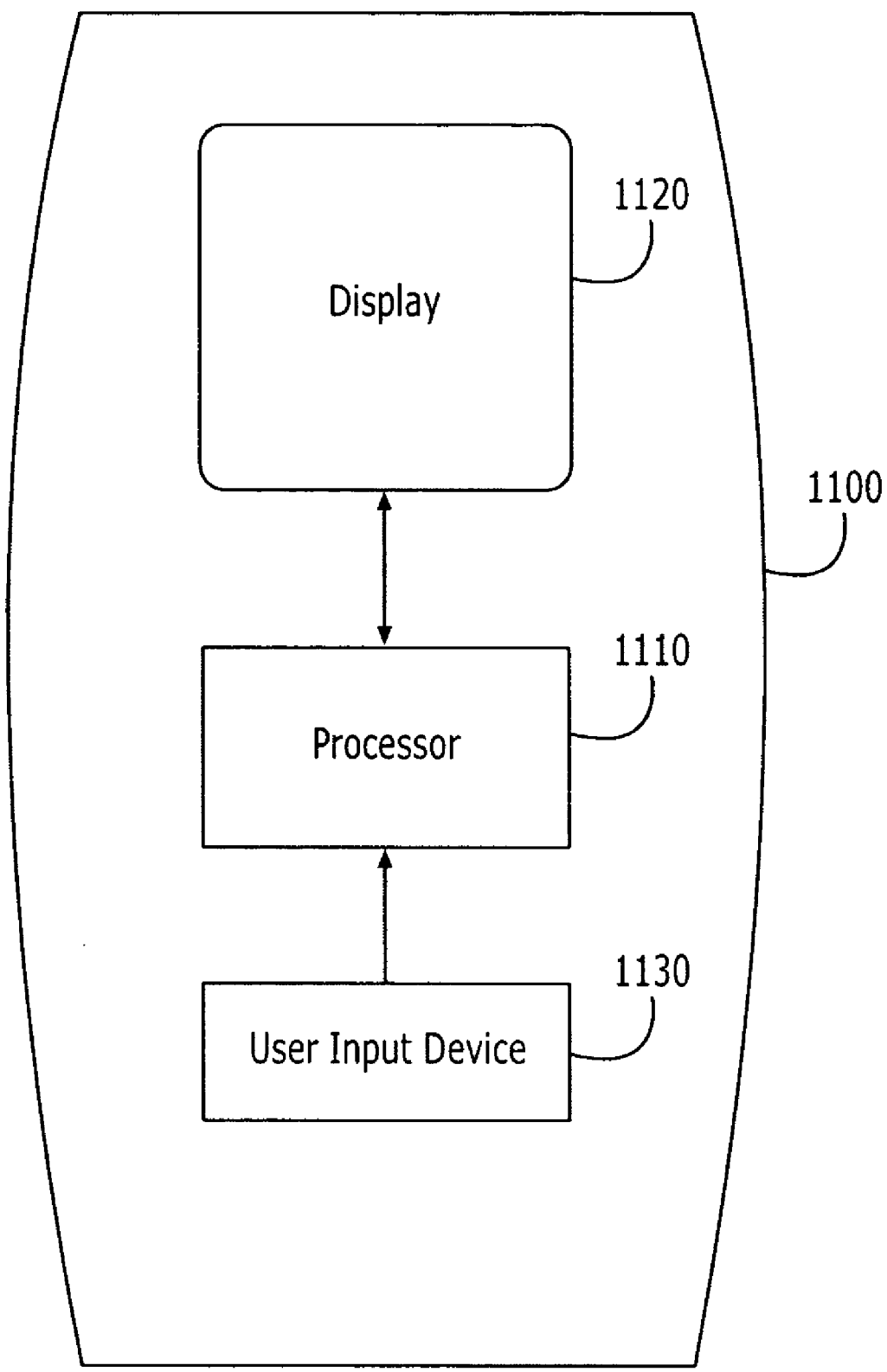
FIG. 11 is a schematic diagram illustrating a portable electronic device according to further embodiments of the present invention.

FIG. 11 illustrates an electronic device 1100 in which embodiments of the present invention may be implemented. The device 1100 includes a display 1120 and a user input device 1130 (e.g., a joystick, keypad, touchpad, trackpointer, touchscreen or the like) that are operatively associated with a processor 1110 (e.g., at least one microprocessor, microcontroller, digital signal processor (DSP), application specific integrated circuit (ASIC)). The processor 1110 may be configured using, for example, software and/or firmware (not shown) stored in memory (not shown) and/or downloaded or otherwise transferred to the processor 1110, to provide menu management operations according to the present invention, such as the menu management operations described above with reference to FIGS. 1-10.

In the drawings and specification, there have been disclosed exemplary embodiments of the present invention. Although specific terms are employed, they are used in a generic and descriptive sense only and not for purposes of limitation, the scope of the invention being defined by the following claims.

That which is claimed:

1. A method of managing display of menu items on a display of an electronic device, the method comprising:
   defining first and second menus comprising respective first and second groups of individually selectable menu items, wherein the first group of menu items is a subset of the second group of menu items;
   displaying the first menu as a first rectangular array having plural rows and plural columns of individually selectable menu items;
   responsive to user activation of a menu expansion function, displaying the second menu as a second rectangular array having a greater number of rows and/or columns of individually selectable menu items than the first rectangular array;
   defining a third menu comprising a third group of individually selectable menu items, wherein the first and second groups of menu items are subsets of the third group of menu items;
   responsive to user activation of a menu expansion function, transitioning from display of the second rectangular array to display of the third menu as a third rectangular array having a greater number of rows and/or columns of individually selectable menu items than the second rectangular array; and responsive to user activation of a menu reduction function, transitioning from display of the third rectangular array to display of the first rectangular array.

2. A method according to claim 1:
wherein the first menu comprises a menu expansion function menu item; and
wherein displaying the second menu as a second rectangular array having a greater number of rows and/or columns of individually selectable menu items than the first rectangular array comprises transitioning from display of the first menu to display of the second menu responsive to user selection of the menu expansion function menu item.

3. A method according to claim 1, wherein the method further comprises transitioning from display of the second menu to display of the first menu responsive to user activation of a menu reduction function.

4. A method according to claim 3, wherein the second menu comprises a menu reduction function menu item, and wherein transitioning from display of the second menu to display of the first menu comprises transitioning from display of the second menu to display of the first menu responsive to user selection of the menu reduction function menu item.

5. A method according to claim 1, wherein defining first and second menus comprises assigning a menu item to the first menu or the second menu responsive to a user input.

6. A method according to claim 5, wherein defining first and second menus comprises assigning a menu item to the first menu or the second menu responsive to frequency of usage of a function corresponding to the menu item.

7. A method according to claim 1, wherein the first group of menu items have the same arrangement with respect to one another in the first and second rectangular arrays.

8. A method according to claim 1, wherein the menu items comprise at least one of graphic icons and text.

9. A method according to claim 1, wherein the electronic device comprises a portable electronic device.

10. An electronic device, comprising:
a display;
a user input device; and
a processor operatively associated with the user input device and the display, the processor configured to define first and second menus comprising respective first and second groups of individually selectable menu items, the first group of menu items a subset of the second group of menu items, to display the first menu as a first rectangular array having plural rows and plural columns of individually selectable menu items, responsive to user activation of a menu expansion function via the user input device, to display the second menu as a second rectangular array having a greater number of rows and/or columns of individually selectable menu items than the first rectangular array, to define a third menu comprising a third group of individually selectable menu items, the first and second groups of menu items subsets of the third group of menu items, to transition from display of the second rectangular array to display of the third menu as a third rectangular array having a greater number of rows and/or columns of individually selectable menu items than the second rectangular array responsive to user activation of a menu expansion function via the user input device and to transition from display of the third rectangular array to display of the first rectangular array responsive to user activation of a menu reduction function via the user input device.

11. A device according to claim 10:
wherein the first menu comprises a menu expansion function menu item; and
wherein the processor is operative to transition from display of the first menu to display of the second menu responsive to user selection of the menu expansion function menu item via the user input device.

12. A device according to claim 10, wherein the processor is further operative to transition from display of the second menu to display of the first menu responsive to user activation of a menu reduction function via the user input device.

13. A device according to claim 12, wherein the second menu comprises a menu reduction function menu item, and wherein the processor is operative to transition from display of the second menu to display of the first menu responsive to user selection of the menu reduction function menu item via the user input device.

14. A device according to claim 10, wherein the processor is operative to assign a menu item to the first menu or the second menu responsive to a user input via the user input device.

15. A device according to claim 14, wherein the processor is operative to assign a menu item to the first menu or the second menu responsive to frequency of usage of a function corresponding to the menu item.

16. A device according to claim 10, wherein the first group of menu items have the same arrangement with respect to one another in the first and second rectangular arrays.

17. A device according to claim 10, wherein the menu items are graphic icons.

18. A device according to claim 10, wherein the user input device comprises at least one of a key, a trackpointer, touchpad, a joystick, and a touchscreen.

19. A program product for managing display of menu items on a display of an electronic device, the program product comprising code embodied in a processor-accessible medium, the code comprising:
code configured to define first and second menus comprising respective first and second groups of individually selectable menu items, wherein the first group of menu items is a subset of the second group of menu items;
code configured to display the first menu as a first rectangular array having plural rows and plural columns of individually selectable menu items and, responsive to user activation of a menu expansion function, to display the second menu as a second rectangular array having a greater number of rows and/or columns of individually selectable menu items than the first rectangular array; and
code configured to define a third menu comprising a third group of individually selectable menu items, the first and second groups of menu items subsets of the third group of menu items, to transition from display of the second rectangular array to display of the third menu as a third rectangular array having a greater number of rows and/or columns of individually selectable menu items than the second rectangular array responsive to user activation of a menu expansion function via the user input device and to transition from display of the third rectangular array to display of the first rectangular array responsive to user activation of a menu reduction function via the user input device.

20. A program product according to claim 19:

wherein the first menu comprises a menu expansion function menu item; and wherein the code configured to display the first menu as a first rectangular array having plural rows and plural columns of individually selectable menu items and, responsive to user activation of a menu expansion function, to display the second menu as a second rectangular array having a greater number of rows and/or columns of individually selectable menu items than the first rectangular array comprises code configured to transition from display of the first menu to display of the second menu responsive to user selection of the menu expansion function menu item.

21. A program product according to claim 19, wherein the code embodied in a processor-accessible medium further comprises code configured to transition from display of the second menu to display of the first menu responsive to user activation of a menu reduction function.

22. A program product according to claim 21, wherein the second menu comprises a menu reduction function menu item, and wherein the code configured to transition from display of the second menu to display of the first menu comprises code configured to transition from display of the second menu to display of the first menu responsive to user selection of the menu reduction function menu item.

23. A program product according to claim 19, wherein the code configured to define first and second menus comprises code configured to assign a menu item to the first menu or the second menu responsive to a user input.

24. A program product according to claim 23, wherein the code configured to define first and second menus comprises code configured to assign a menu item to the first menu or the second menu responsive to frequency of usage of a function corresponding to the menu item.

25. A program product according to claim 19, wherein the first group of menu items have the same arrangement with respect to one another in the first and second rectangular arrays.

26. .A program product according to claim 19, wherein the menu items comprise at least one of graphic icons and text.

27. A program product according to claim 19, configured to be processed in a processor of a portable electronic device.

* * * * *